(12) United States Patent
Moe

(10) Patent No.: US 6,209,213 B1
(45) Date of Patent: Apr. 3, 2001

(54) MULTI-PURPOSE MEASURING TOOL

(76) Inventor: Richard J. Moe, #215, 215-86 Avenue SE., Calgary, Alberta (CA), T2H 2K5

(*) Notice: Subject to any disclaimer, the term of this patent is extended or adjusted under 35 U.S.C. 154(b) by 0 days.

(21) Appl. No.: 09/122,679

(22) Filed: Jul. 27, 1998

(51) Int. Cl.[7] .............. B43L 7/10; G01B 3/06; G01B 3/10; G01B 3/56
(52) U.S. Cl. .............. 33/471; 33/451; 33/760; 33/765; 33/769; 33/538
(58) Field of Search .............. 33/1 N, 471, 451, 33/452, 453, 465, 494, 755, 759, 760, 765, 769, 534, 538, 679.1

(56) References Cited

U.S. PATENT DOCUMENTS

| | | |
|---|---|---|
| Re. 27,496 | 10/1972 | Andrews . |
| 1,007,269 | 10/1911 | Clarke ................... 33/451 |
| 1,323,742 * | 12/1919 | Burroughs ............... 33/760 |
| 2,683,933 * | 7/1954 | McFarland .............. 33/452 |
| 2,797,489 | 7/1957 | Roe . |
| 3,003,244 * | 10/1961 | Fogliano ................ 33/755 |
| 3,004,346 * | 10/1961 | Quenot .................. 33/765 |
| 4,144,650 | 3/1979 | Rawlings et al. . |
| 4,394,801 | 7/1983 | Thibodeaux ............. 33/496 |
| 4,481,720 | 11/1984 | Sury ..................... 33/451 |
| 4,745,689 | 5/1988 | Hiltz .................... 33/451 |
| 4,916,822 * | 4/1990 | Johnson ................. 33/465 |
| 4,922,621 | 5/1990 | Maier .................... 33/465 |
| 4,955,141 * | 9/1990 | Welch ................... 33/471 |
| 5,189,804 | 3/1993 | Ostachowski ........... 33/471 |
| 5,586,395 | 12/1996 | Malczewski ............ 33/471 |

* cited by examiner

Primary Examiner—Christopher W. Fulton
(74) Attorney, Agent, or Firm—Siemens Patent Services

(57) ABSTRACT

A multi-purpose measuring tool has an elongate base and arm pivotally connected at rounded ends thereof in an angularly variable relation to perform multiple functions, including measuring inclines, measuring corner angles, measuring distances, use as a square, use as a bevel gauge and use as a torpedo level. A retractable measuring tape housed within the arm has a terminal finger gripping end adapted to be pulled away from the arm and removably attached to a distal end of the base. The measuring tape is dual purpose in that one side of the tape is used for determining the angle of the arm relative to the base to perform some of the above functions, and the other side of the tape is used for traditional linear distance measurements. The tool's base includes a "vertical" bubble level and the arm includes a "horizontal" bubble level to perform some of the above functions.

7 Claims, 7 Drawing Sheets

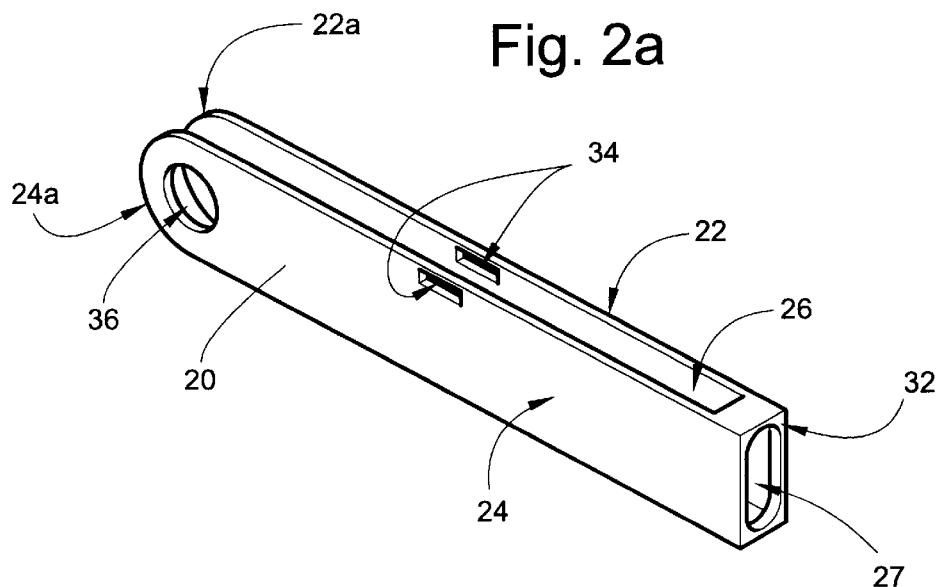
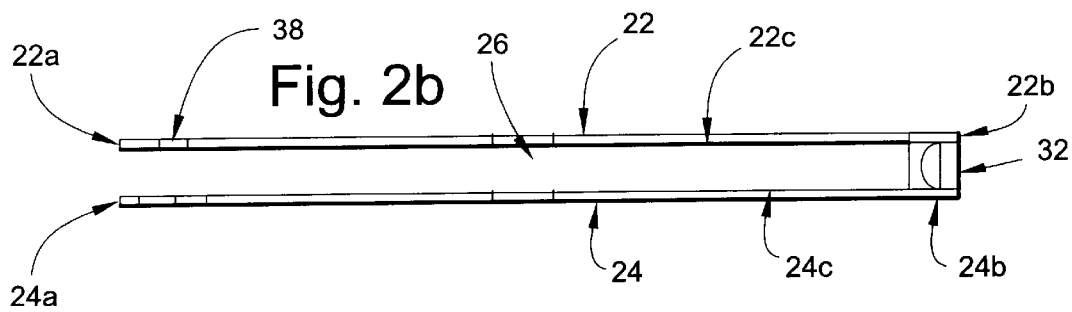

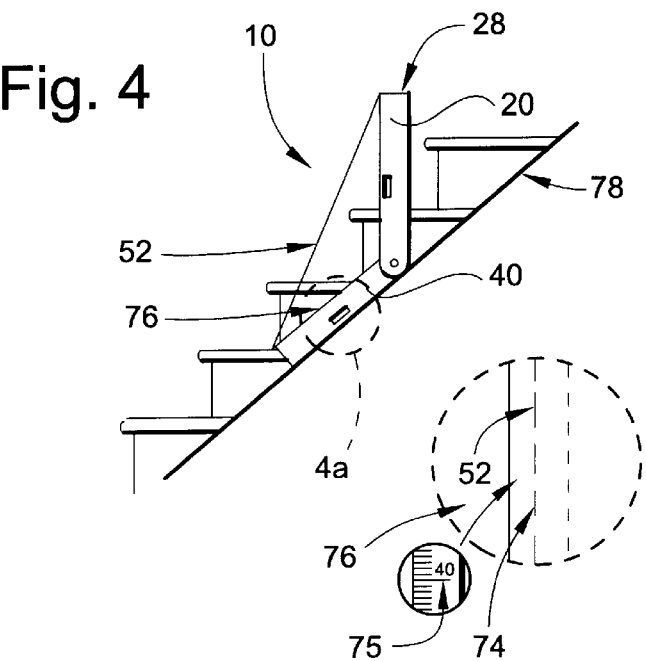
Fig. 4
Fig. 4a
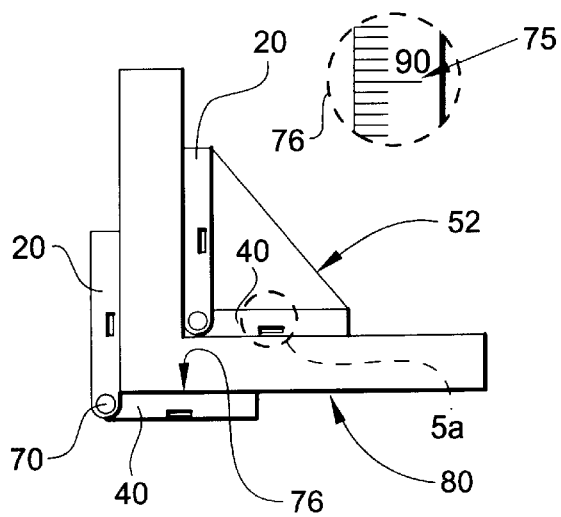
Fig. 5a
Fig. 5

MULTI-PURPOSE MEASURING TOOL

FIELD OF THE INVENTION

The present invention relates to the type of tools used by artists, carpenters, machinists, masons, roofers, woodworkers and others for making various types of measurements, such as leveling and measuring angles and distances.

BACKGROUND OF THE INVENTION

Various multi-purpose tools have been proposed which combine several functions, such as that of a level, square and protractor. Such tools generally comprise two pivotally connected arms with protractor-like, angle measuring indicia near the pivot point, or elbow, to read the angle between the arms, and a bubble level on one of the arms for leveling purposes.

A disadvantage of such prior art tools is that they can not be relied upon for making precise angle measurement between two adjoining surfaces or for tasks which require cuts at precise angles, such as mitering corners for picture frames or floor moldings, for example, and for non-traditional cuts such as 45 and 90 degrees. The available space for angle markings at the elbows of such tools is severely confined, and so the angle gradations are often limited to increments of 5 degrees or more. These tiny scales are also difficult to read, and so the decree of accuracy of such scales is low. As a result, mitered corners are either undercut or overcut, resulting in undesireable gaps and poor fits.

Another disadvantage of the prior art tools is that the elbows are not structured to enter an inside corner between two adjoining surfaces as close as possible, and so the actual measured angle is spaced further from the corner than may be desired. Such measured angle may not be the true angle at the inside corner, particularly where the adjoining surfaces are slightly warped or have other surface imperfections.

A further disadvantage is that the prior art tools combine fewer functions or tasks than desired by tradespersons, and so other tools or instruments must be used or carried to perform the omitted functions, such as that of a measuring tape.

What is therefore desired is a novel multi-purpose measuring tool which overcomes the limitations and disadvantages of the existing tools. Preferably, it should provide for a precise reading of angles between adjoining surfaces of up to 0.5 degrees. The angle readings should be easily visible to a user in relatively large numerals for enhanced reliability. In particular, the tool should employ a dual-purpose flexible measuring tape to make traditional measurements of distance, and for use in a novel manner to provide the above-noted angle readings. The tool should have an elbow design which permits close entry into inside corners for more precise measurement of inside angles. The tool should be of a compact design to facilitate handling and use, and should combine multiple functions, including measuring inclines, corner angles and distances, and be capable of use as a square, bevel gauge and torpedo level.

SUMMARY OF THE PRESENT INVENTION

In one aspect the invention provides a multi-purpose measuring tool comprising:
an elongate body portion having a rounded terminal end and an opposed distal end,
an elongate arm having a rounded terminal end, said body portion and arm being pivotally connected at said rounded ends;
an extendible, flexible measuring tape operatively engaged to said arm, said tape having:
a finger-grasping free end adapted to be removably attached to the body portion proximate said distal end when said arm is unfolded from said body portion; and,
a first surface with first indicia thereon for indicating the angle of the arm relative to the body portion.

In another aspect the invention provides a multi-purpose measuring tool comprising an elongate base having a rounded first end and an elongate arm having a rounded first end, said base and arm being pivotally connected at said first ends in an angularly variable relation to perform a function from the group of functions consisting of measuring inclines, measuring corner angles, measuring distances, use as a square, use as a bevel gauge and use as a torpedo level.

BRIEF DESCRIPTION OF THE DRAWING FIGURES

Embodiments of the invention will now be described, by way of example only, with reference to the accompanying drawings, wherein:

FIG. 2a is a perspective view of the body portion of FIG. 1 with the arm removed;

FIG. 2b is a top view of the body portion of FIG. 2a;

FIG. 2c is a side view of the body portion of FIG. 2a;

FIG. 3b is a top view of the arm of FIG. 3a;

FIGS. 4 to 9 illustrate some uses of the tool of the present invention, namely for measuring inclines (FIG. 4), inside and outside angles (FIG. 5), distances (FIG. 6), and for use as a square (FIG. 7), a bevel gauge (FIG .8) and a torpedo level (FIG. 9); FIGS. 4a and 5a are close up views of a portion of the tool shown in FIGS. 4 and 5, respectively.

Figures 1, 1A:
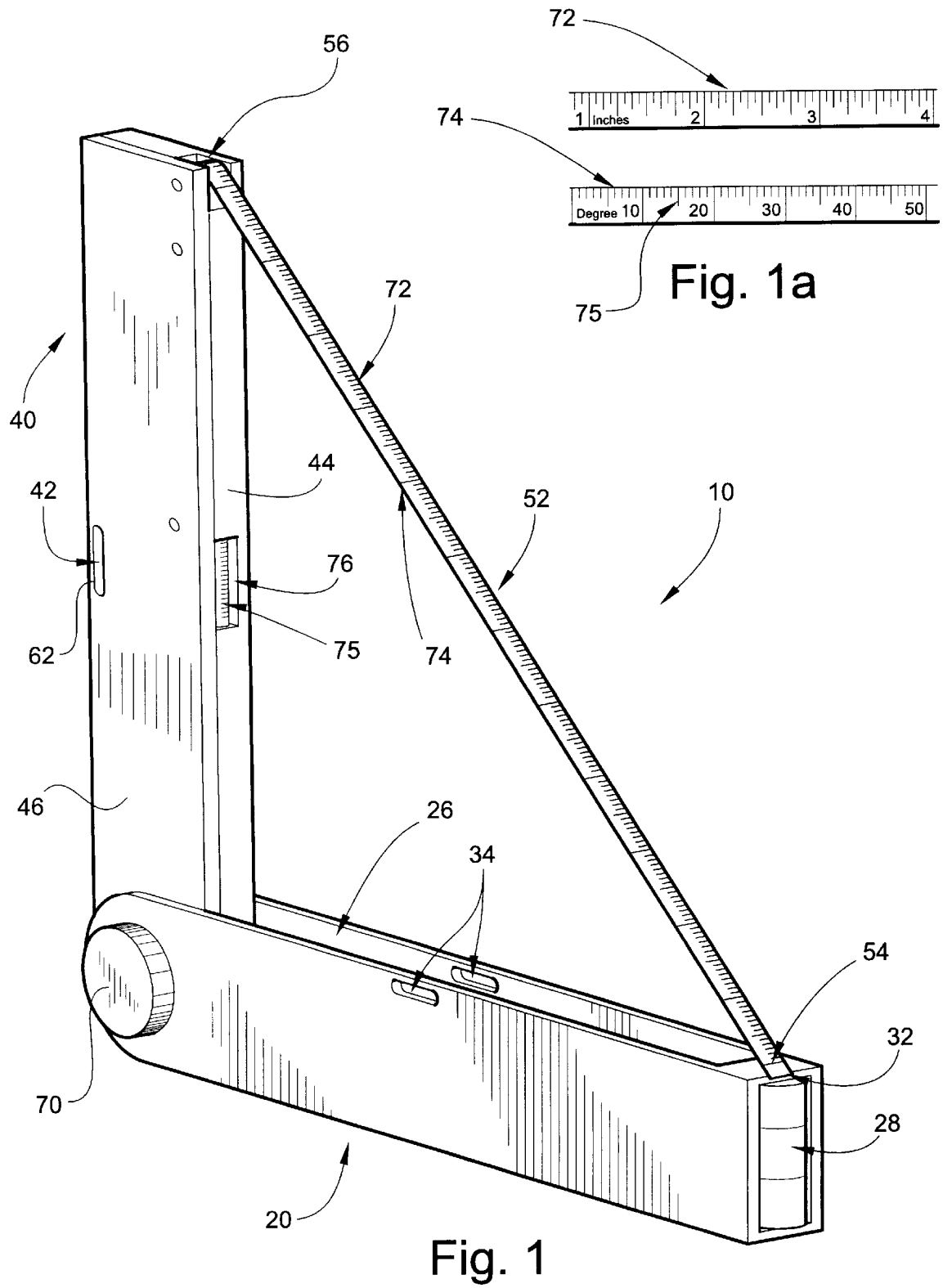
FIG. 1 is a schematic view of a multi-purpose measuring tool according to the present invention showing an arm pivotally unfolded from a body portion and a measuring tape extending from the arm to the body portion.
FIG. 1a is a top and bottom view of measuring tape 52.
Figure 2C:
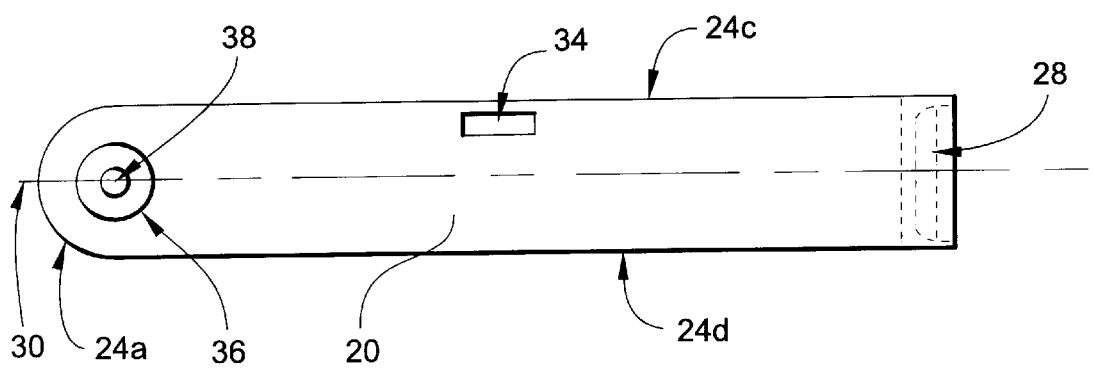
Figure 2D:
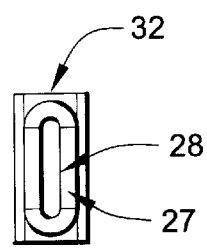
FIG. 2d is an end view from the right of the body portion of FIG. 2a showing a bubble level located perpendicularly to the longitudinal axis of the body portion.

LIST OF REFERENCE NUMERALS IN DRAWINGS 10 tool
20 base of 10
22 back plate of 20
22a rounded terminal end of 22
22b distal end of 22
22c upper edge of 22
22d lower edge of 22
24 front plate of 20
24a rounded terminal end of 24
24b distal end of 24
24c upper edge of 24
24d lower edge of 24

26 hollow portion of 20
27 view port for 28
28 vertical bubble level
30 longitudinal axis of 20
32 lip
34 cut outs
36 circular opening in 24
38 hole in 22
40 arm
42 horizontal bubble level
44 back panel of 40
46 front panel of 40
48 inner recess in 44
50 stem in 48
51 rollers within 40
52 measuring tape
54 stopper/hooked end of 52
56 slit
58 top surface of 40
59 bottom surface of 40
60 recess in 40
62 cut outs
64 rounded terminal end of 40
66 circular opening in 44
68 distal end of 40
70 knob
72 tape's outside surface
74 tape's inside surface
75 indicia on 74
76 view window in 59
78 stairs/ramp
80 corner wall
81 quick reference marks on 44

DESCRIPTION OF PREFERRED EMBODIMENT

The figures show a multi-purpose measuring tool (generally designated by reference numeral 10) having a body portion or base 20 pivotally connected with an arm or tongue 40 so that the arm 40 may be folded or collapsed into the base 20 (as in FIG. 9) and unfolded or extended (as in FIGS. 1, 4–8) for operation by a user, such as an artist, carpenter, machinist, mason, roofer, woodworker, and the like. The tool's various uses will be highlighted later.

Referring specifically to FIGS. 1 and 2a to 2d, the base 20 has a pair of alternately disposed spaced apart back and front plates 22 and 24 forming a hollow portion or enclosure 26 therebetween for receiving the arm 40 when folded into the base. Each of the plates 22, 24 has a rounded terminal end 22a and 24a, respectively, and a flat or square distal end 22b and 24b, respectively. The distal ends 22b, 24b are joined to form a housing with a view port 27 for holding a first level indicating bulb 28 perpendicularly to the base's longitudinal axis 30, which bulb is referred to herein as a "vertical bubble level". A top portion of the housing above the view port 27 forms a lip 32. The upper edges 22c and 24c and the lower edges 22d and 24d of the plates 22, 24, respectively, are planar and run parallel to the axis 30 for performing various leveling measurements and for use as straight edges, as discussed later. Each plate 22, 24 has a cut out 34 below the respective upper edge 22c, 24c for viewing a second bubble level 42 in the arm 40 when the arm 40 is folded into the base 20. The rounded terminal ends 22a, 24a are semi-circular in shape and centered on a circular opening 36 in the front plate 24 and on a hole 38 in back plate 22. The transition between the base's rounded terminal ends 22a, 24a and the respective upper and lower edges 22c, 24c and 22d, 24d should be smooth and continuous as illustrated without any steps, ledges, lips or other discontinuities.

Referring now to FIGS. 1 and 3a to 3d, the arm 40 is formed by alternately disposed back and front panels 44 and 46 which may be snapped together or held together by other means such as glue, self tapping screws, and the like. The back panel 44 has a generally circular inner recess 48 with a stem 50 for receiving and retaining a roll or spool of measuring tape 52. The tape 52 extends through the arm 40 past several rollers 51 and exits through a slit 56 in a distal end 68. The spool of tape 52 is biased in a known manner to keep the tape taught and to retract the tape into the arm 40, and the tape's terminal end has a finger engaging stopper 54, such as a metal or plastic hooked sleeve. A top surface 58 of the arm has a recess 60 for lodging the second level indicating bulb 42, referred to herein as a horizontal bubble level. Cut outs 62 are provided on either side of the arm 40 for viewing the vertical bubble level laterally, both when the arm is folded and unfolded with the base 20. Hence, when the arm is folded, the cut outs 62 are in line with the corresponding cut outs 34 in the base for an unobstructed lateral view of the vertical bubble level 42. As with the base cut outs 34, the arm cut outs 62 are machined below the top surface 58 so as not to interrupt the continuous edges of the top surface to allow their use as straight edges, for instance. The transition between the arm's rounded terminal end 64 and the top and bottom surfaces 58, 59 should comparable to that of the base, namely smooth and continuous.

The arm 40 has a flat or square distal end 68 and a rounded terminal end 64 semi-circular in shape which is centered on or concentric with a circular opening 66 through the arm. The arm 40 is rotatably mounted to the base 20 in a known manner by a connecting bolt passing through the aligned openings 36, 66 and hole 38. An adjustment knob 70, operatively engaged to the connecting bolt, may be rotated by a user in one direction to clamp the arm's terminal end 64 between the base's terminal ends 22a, 24a, thereby holding or fixing the position of the arm relative to the base. Rotation of the knob 70 in the opposite direction loosens the base's hold on the arm to allow the arm to be swung to another position relative to the base. Whether the arm 40 is folded into the base 20 or unfolded, the rounded terminal ends 22a, 24a and 64 should be flush with one another so that the tool's elbow may fit as close as possible into an inside corner (as shown in FIG. 5) when the arm and base rest on adjoining surfaces. Likewise, the arm's top surface 58 and bottom surface 59 should sit flush with the base's respective upper and lower edges 22c, 24c and 22d, 24d when the arm and base are folded together.

Figure 3A:
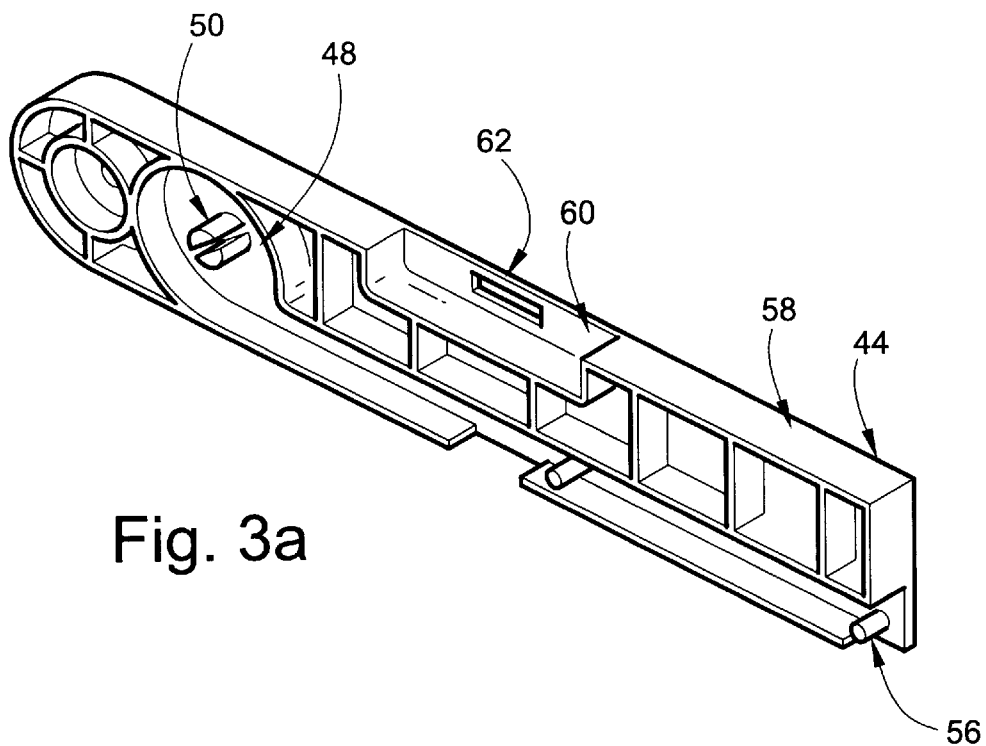
FIG. 3a is a perspective view of a back panel of the arm of FIG. 1 showing the housing for the measuring tape.
Figure 3B:
Figure 3C:
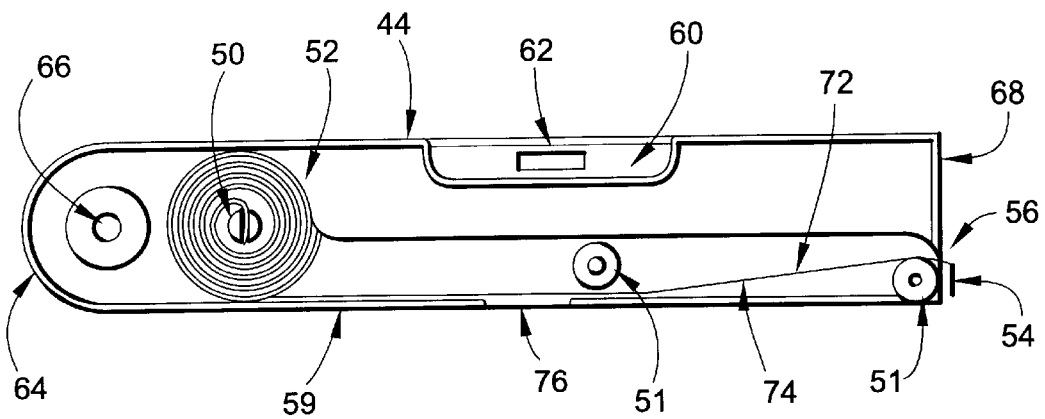
FIG. 3c is an inside view of the arm of FIG. 3a with the tape measure inserted.
Figure 3D:
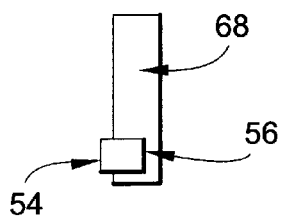
FIG. 3d is an end view from the right of the arm and tape measure of FIG. 3c.
Figure 3E:
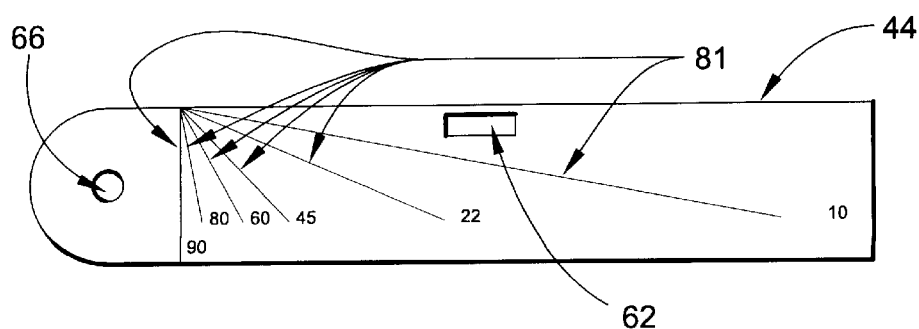
FIG. 3e is an outside view of the arm of FIG. 3a showing quick reference marks thereon for angle measurements.

An important aspect of the invention is the ability to measure both distances and angles using the flexible measuring tape 52. The tape 52 has indicia on both sides (i.e. is double sided), namely a top or outside surface 72 is marked in imperial or metric units for distance (e.g. in inches or millimeters), and the opposed bottom or inside surface 74 is marked in degrees or other suitable units (indicated by 75) for angle measurements. Angle measurements are made by unfolding the arm from the base and hooking the tape's terminal or free end 54 to the base's lip 32, and then rotating the arm 40 and base 20 to a desired orientation, at which point the angle between the arm and base is displayed from the tape's inside surface 74 through a view window 76 in the bottom surface 59 of the arm (see FIGS. 1, 4a and 5a). An arrow or like visual reference marking etched on the side of the window 76 (shown in FIG. 1 & 4a) indicates the angle. Good results have been achieved using gradations 75 on the tape's inside surface 74 of as little as 0.5 degrees. Hence, the user obtains a much more accurate angle measurement than the protractor-like means of prior art devices where the angle indicating indicia are located on the elbow of comparable tools and are generally accurate to about 5.0 degrees or so. The tool 10 of the present invention preferably also incorporates such angle indicating indicia for quick reference and for acute angles where the tape can not be properly seen through the view window 76. Referring to FIG. 3e, quick reference marks 81 are located on the side of the back panel 44 and are read in a known manner in conjunction with the upper edge 22c of the base 20 when the arm is unfolded.

The operation and many advantages of the present invention may now be better understood, with particular reference to FIGS. 4–9.

In FIG. 4 the tool 10 is used to measure the angle of an inclined surface, such as a ramp or set of stairs 78. The arm 40 and base 20 are first unfolded sufficiently so that the tape's terminal end 54 can be hooked onto the base's lip 32. The bottom surface 59 of the arm 40 is then placed flush against the ramp, and the base 20 is rotated from the arm into a vertical position, namely until the bubble in level 28 is centered. The inclination angle may then be read to within 0.5 degrees through the view window 76 on the tape's inside surface 74 (as indicated in FIG. 4a), which reading is much easier to make and more accurate than that of similar prior devices, as noted above. The present arrangement is capable of reading angles approaching 180 degrees.

In FIG. 5, a similar procedure is followed as for FIG. 4 to measure the inside angle of a corner wall 80. The tool's rounded terminal ends and their smooth transition to the rest of the base and arm allow the tool's elbow to fit close into the corner for a better reading of the inside corner angle, in this instance a 90 degree angle as read from the tape's indicia 75 (see FIG. 5a) through the view window 76. The tape measure method can also be used to read the outside corner by resting the arm and base against the corner as shown, locking the arm and base with knob 70, lifting the tool away from the corner, pulling the tape 52 from the arm and hooking it onto the base's lip 32, and then reading the angle through the view window 76. Alternately, a reading, albeit a less precise one, of the outside corner angle may be made without lifting the tool from the corner by using the quick reference marks on the arm.

Figure 6:
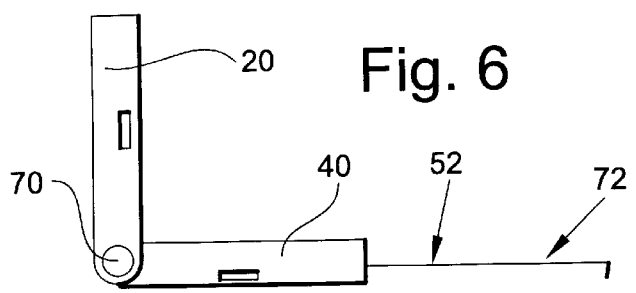

In FIG. 6, the tape 52 is used measure distance by extending the tape from the tool's slit 56 and reading the indicia on the tape's outside surface 72.

Figure 7:
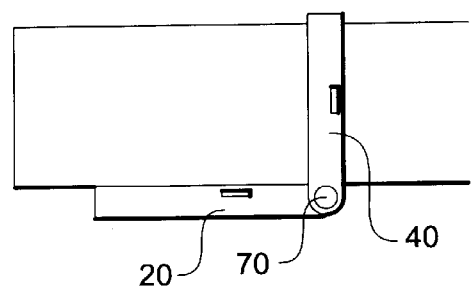

In FIG. 7, the tool 10 may be used as a square by aligning the arm and base at a right angle and locking this orientation with the knob 70. The right angle may be achieved by first using the tape measure as described above to read an angle of 90 degrees, locking the arm and base with the knob 70, and then releasing the tape so that it fully retracts into the base. The continuous edges of the base and arm may be used as straight edges for marking purposes. Alternately, the quick reference marks may be employed.

Figure 8:
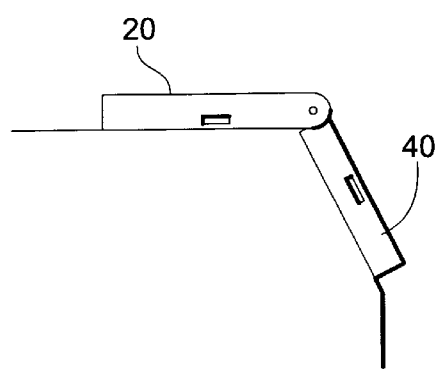

In FIG. 8, the tool is used as a bevel gauge to replicate or duplicate a particular angle by placing the base and leg flush against the adjacent inclined surfaces as shown, fixing the captured angle by tightening knob 70, and then moving the tool to other locations as required. Angle measurements may also be made as described above for the outside angle in FIG. 5.

Figure 9:
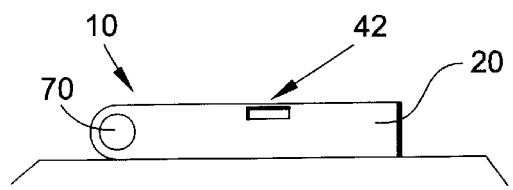

In FIG. 9 the tool is collapsed (i.e. the leg is folded in the base) and used as a torpedo level by sitting the tool on a surface and using the horizontal bubble level 42 to level the surface.

Hence, the tool 10 of the present invention has multiple uses, and in particular is adapted to provide angle measurements that are easier to read and more precise than prior art devices. It will be appreciated that the tool may be made of any number of suitable materials, either alone or in combination, such as plastic, aluminum, stainless steel, and the like.

The above description is intended in an illustrative rather than a restrictive sense, and variations to the specific configurations described may be apparent to skilled persons in adapting the present invention to other specific applications. Such variations are intended to form part of the present invention insofar as they are within the spirit and scope of the claims below. For instance, the lip 32 on the base 20 may be replaced by equivalent hook means, such as a metal loop attached to the distal end.

I claim:

1. A multi-purpose measuring tool comprising:
    an elongate body portion having a proximal end and a distal end;
    an elongate arm having a proximal end rotatably mounted to said proximal end of said body portion and a distal end; and
    an extensible, flexible measuring tape having a proximal end received and retained within said arm, and a distal end exiting from inside said arm, wherein said measuring tape
        is disposed to engage said body portion,
        is constrained to define a straight course between said arm and said body portion along its entire exposed length when said measuring tape engages said body portion,
        bears indicia suitable for angle measurements,
        is disposed to display selectively some of said indicia indicating the angle existing between said body portion and said arm via a window situated centrally upon an external edge of said elongate arm, and wherein
    said measuring tool is devoid of structure engaging said measuring tape which is external to said body portion and said arm.

2. A measuring tool according to claim 1, wherein said window has a visual reference marking disposed to indicate the angle.

3. The measuring tool according to claim 1, wherein said measuring tape has a hook for engaging said body portion, and said body portion has a lip for engaging said hook.

4. The measuring tool according to claim 1, further comprising a knob disposed selectively to clamp said arm and said body portion together and to loosen said arm relative to said body.

5. The measuring tool according to claim 1, further comprising a vertical bubble level and a horizontal bubble level fixed to said tool.

6. The measuring tool according to claim 5, wherein said vertical bubble level is fixed to said body portion and said horizontal bubble level is fixed to said arm.

7. A multi-purpose measuring tool comprising:
    an elongate body portion having a vertical bubble level, a proximal end, and a distal end;
    a knob disposed selectively to clamp said arm and said body portion together and to loosen said arm relative to said body;
    an elongate arm having a horizontal bubble level, a proximal end rotatably mounted to said proximal end of said body portion, and a distal end;
    an extensible, flexible measuring tape having a proximal end received and retained within said arm, and a distal end exiting from inside said arm, wherein said measuring tape disposed to engage said body portion, is constrained to define a straight course between said arm and said body portion along its entire exposed length when said measuring tape engages said body portion, has a hook for engaging said body, bears indicia suitable for angel measurements, and is disposed to display selectively some of said indicia indicating the angle existing between said body portion and said arm; and wherein said measuring tool is devoid of structure engaging said measuring tape which is external to said body portion and said arm, and wherein said measuring tool has a window, situated centrally upon an external edge of said elongate arm, disposed to display a visual reference marking disposed to indicate the measured angle, and that indicia displayed through said window indicates the angle existing between said body portion and said elongate arm, and a lip for engaging said hook.

* * * * *